G. FREYMOYER.
Smut Machine.
No. 3,149.
Patented June 24, 1843.
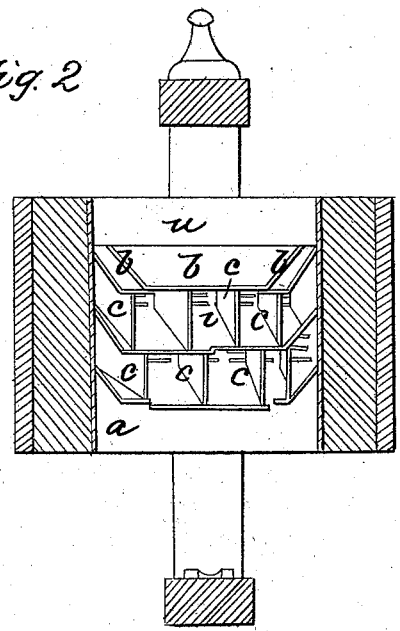
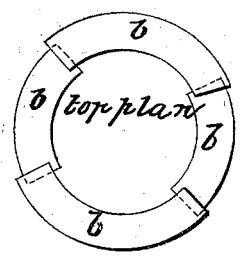
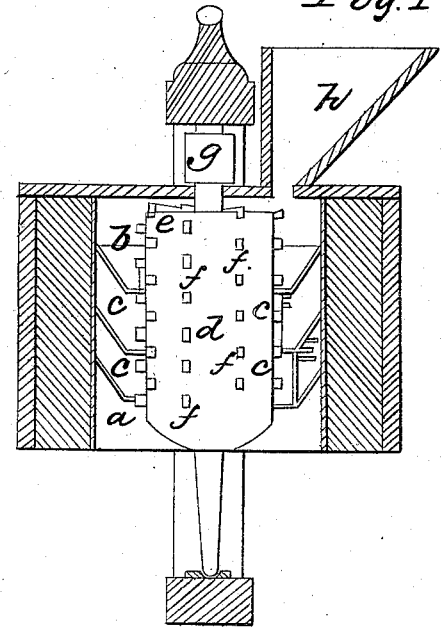

UNITED STATES PATENT OFFICE.

GEO. FREYMOYER, OF CHICHESTER, PENNSYLVANIA.

SMUT-MACHINE.

Specification of Letters Patent No. 3,149, dated June 24, 1843.

*To all whom it may concern:*

Be it known that I, GEORGE FREYMOYER, of Chichester, in the county of Delaware and State of Pennsylvania, have invented a new and useful Improvement in Machines for Cleaning Grain from Smut and other Foreign Substances; and I do hereby declare that the following is a full, clear, and exact description thereof, reference being had to the accompanying drawing, which forms a part of this specification, Figure 1 being a vertical section; Fig. 2, section of case showing the inside formation.

The nature of my invention consists in forming the case of a smut machine in such a way as that the grain shall be constantly directed against the runner in the most effective manner, so that it shall be constantly acted on in running through the machine, and thereby cleaning it in the most perfect way. The outside of the case ($a$) is of a cylindrical form; and is perforated with holes ($i$). Near the top are four horizontal segments of conical rings ($b$), inverted and each extending around a little more than a quarter of a circle and two of them standing a little above the others overlapping at their terminations. These rings are firmly affixed to the case, and projecting in and downward. At a suitable distance below the segments above named there is another row of similar construction, and below them at equal distances are any number of additional ones. Between the first and second ring of segments are vertical pieces ($c$), extending from one to the other. These pieces stand obliquely to the radii of the circle. Between the second and third ring are other vertical pieces so placed as to break joint with those above, and so on through the series the inner surface of the rings and vertical divisions projecting equally.

The runner ($d$) is made and stepped like those in common use; the center part being a solid cylinder through which the shaft passes; the upper end is flat and has any number of flat metallic bars ($e$) let into it about half their width and extending from the shaft out beyond the surface of the cylinder far enough to form beaters. There are rows of beaters ($f$) placed horizontally around the cylinder its whole length, said rows breaking joint with each other and standing a little distance apart. They are flat, thin plates of metal, and stand vertically on the cylinder. This runner is driven by a band which passes over a pulley ($g$) on the shaft above. The outer case is surrounded by a box, and is covered in on top, a hole being made in the cover for the admission of grain from the hopper ($h$). On leaving the machine the grain passes through a fan of common construction not shown in the drawing.

What I claim as my invention and desire to secure by Letters Patent is—

Constructing the case in the manner described so that all the grain passing through the machine shall be deflected constantly toward the runner by means of the segment ($b$) and vertical pins ($c$) combined in the manner above specified.

GEORGE FREYMOYER.

Witnesses:
EZRA E. BRATTON,
BENJN. F. JOHNSON.